US011481981B2

(12) United States Patent
Melinek et al.

(10) Patent No.: US 11,481,981 B2
(45) Date of Patent: Oct. 25, 2022

(54) GENERATED OFFERING EXPOSURE

(71) Applicants: Oded Melinek, Kiryat-Ono (IL); Maier Fenster, Petach-Tikva (IL)

(72) Inventors: Oded Melinek, Kiryat-Ono (IL); Maier Fenster, Petach-Tikva (IL)

(*) Notice: Subject to any disclaimer, the term of this patent is extended or adjusted under 35 U.S.C. 154(b) by 0 days.

(21) Appl. No.: 16/578,458

(22) Filed: Sep. 23, 2019

(65) Prior Publication Data

US 2020/0020168 A1 Jan. 16, 2020

Related U.S. Application Data

(63) Continuation of application No. 15/803,904, filed on Nov. 6, 2017, now Pat. No. 10,424,121.

(60) Provisional application No. 62/418,232, filed on Nov. 6, 2016.

(51) Int. Cl.
*G06T 19/00* (2011.01)
*G06T 7/62* (2017.01)
*G06V 20/20* (2022.01)
*G06Q 30/02* (2012.01)
*G06T 7/20* (2017.01)
*G06T 7/70* (2017.01)
*H04W 4/50* (2018.01)
*G06V 20/68* (2022.01)

(52) U.S. Cl.
CPC .............. *G06T 19/006* (2013.01); *G06T 7/62* (2017.01); *G06V 20/20* (2022.01); *G06Q 30/0241* (2013.01); *G06T 7/20* (2013.01); *G06T 7/70* (2017.01); *G06V 20/68* (2022.01); *H04W 4/50* (2018.02)

(58) Field of Classification Search
CPC ..... G06T 19/006; G06T 7/62; G06K 9/00671; G06K 2209/17; G06Q 30/0241
See application file for complete search history.

(56) References Cited

U.S. PATENT DOCUMENTS

| | | | |
|---|---|---|---|
| 6,094,625 A * | 7/2000 | Ralston | G01C 15/00 239/161 |
| 6,166,744 A | 12/2000 | Jaszlics et al. | |
| 7,901,288 B2 * | 3/2011 | Barsness | G06Q 30/0251 463/30 |
| 8,345,930 B2 | 1/2013 | Tamrakar et al. | |
| 8,995,754 B2 | 3/2015 | Wu et al. | |
| 9,112,960 B2 | 8/2015 | Pinapala Venkata et al. | |

(Continued)

FOREIGN PATENT DOCUMENTS

JP 10-069579 3/1998
WO WO 2016/037612 3/2016

OTHER PUBLICATIONS

Applicant-Initiated Interview Summary dated Mar. 22, 2019 From the US Patent and Trademark Office Re. U.S. Appl. No. 15/803,904. (3 pages).

(Continued)

*Primary Examiner* — Sultana M Zalalee

(57) ABSTRACT

A method of reality augmentation, including:
(a) determining the identity of a container, for example chocolate spread, with a top opening;
(b) acquiring an image of the container from a top thereof;
(c) estimating a geometry of the filling of said container based on said identity and said image; and
(d) overlaying an augmentation, for example, a coupon or a toy, on an image, based on said estimation.

26 Claims, 7 Drawing Sheets

(56) References Cited

U.S. PATENT DOCUMENTS

| | | | |
|---|---|---|---|
| 9,171,368 B2 | 10/2015 | Satish et al. | |
| 9,364,106 B1 | 6/2016 | Ortiz | |
| 10,424,121 B1* | 9/2019 | Melinek | G06K 9/00671 |
| 2007/0121843 A1* | 5/2007 | Atazky | G06Q 30/0269 |
| | | | 379/114.13 |
| 2008/0027814 A1* | 1/2008 | Kulakowski | G06Q 30/0225 |
| | | | 705/14.26 |
| 2008/0275786 A1* | 11/2008 | Gluck | G06Q 30/0239 |
| | | | 705/14.35 |
| 2009/0044505 A1 | 2/2009 | Huster et al. | |
| 2009/0199107 A1* | 8/2009 | Lewis | G06Q 30/0241 |
| | | | 715/745 |
| 2009/0216857 A1* | 8/2009 | Grin | G06F 16/958 |
| | | | 709/218 |
| 2011/0090219 A1* | 4/2011 | Kruglick | G06Q 30/02 |
| | | | 345/420 |
| 2011/0218858 A1* | 9/2011 | Christensen | G06Q 30/0253 |
| | | | 705/14.51 |
| 2011/0304703 A1* | 12/2011 | Ito | G06T 19/006 |
| | | | 348/47 |
| 2012/0021822 A1* | 1/2012 | DeWaal | G07F 17/3237 |
| | | | 463/29 |
| 2012/0179665 A1 | 7/2012 | Baarman et al. | |
| 2012/0256956 A1 | 10/2012 | Kasahara | |
| 2012/0299961 A1 | 11/2012 | Ramkumar et al. | |
| 2013/0030915 A1 | 1/2013 | Statler et al. | |
| 2013/0035975 A1 | 2/2013 | Cavander et al. | |
| 2013/0083064 A1* | 4/2013 | Geisner | G06F 16/434 |
| | | | 345/633 |
| 2013/0252702 A1* | 9/2013 | Schultz | G07F 17/3225 |
| | | | 463/20 |
| 2013/0275219 A1* | 10/2013 | Alvin | G06Q 30/0603 |
| | | | 705/14.58 |
| 2014/0026048 A1* | 1/2014 | Spirer | G06F 3/0484 |
| | | | 715/716 |
| 2014/0083556 A1 | 3/2014 | Darr et al. | |
| 2014/0257959 A1* | 9/2014 | Chung | G06Q 30/0226 |
| | | | 705/14.27 |
| 2014/0278855 A1* | 9/2014 | Clark | G06Q 30/0211 |
| | | | 705/14.13 |
| 2016/0026253 A1 | 1/2016 | Bradski et al. | |
| 2016/0034764 A1 | 2/2016 | Connor | |
| 2016/0112479 A1* | 4/2016 | Jayaraj | H04L 65/4015 |
| | | | 345/633 |
| 2016/0117952 A1 | 4/2016 | Simons-Nikolova et al. | |
| 2016/0163037 A1 | 6/2016 | Dehais et al. | |
| 2016/0179198 A1 | 6/2016 | Levesque et al. | |
| 2016/0203365 A1* | 7/2016 | Breedvelt-Schouten | G06T 19/006 |
| | | | 345/633 |
| 2016/0217273 A1 | 7/2016 | Panzini et al. | |
| 2016/0217614 A1* | 7/2016 | Kraver | G02B 27/017 |
| 2016/0267369 A1* | 9/2016 | Picard | G06K 7/1434 |
| 2017/0061490 A1* | 3/2017 | Ghahremani | H04W 4/023 |
| 2017/0236296 A1* | 8/2017 | Breedvelt-Schouten | G02B 27/017 |
| | | | 382/154 |
| 2017/0257671 A1* | 9/2017 | Yerli | H04N 21/8541 |
| 2017/0263029 A1* | 9/2017 | Yan | G06F 3/04845 |
| 2017/0309051 A1* | 10/2017 | Yamasaki | G06T 13/80 |
| 2017/0330232 A1 | 11/2017 | Kendall et al. | |
| 2017/0336941 A1* | 11/2017 | Gribetz | G06T 19/20 |
| 2018/0190375 A1 | 7/2018 | Chapela et al. | |

OTHER PUBLICATIONS

Notice of Allowance dated Jul. 31, 2019 From the US Patent and Trademark Office Re. U.S. Appl. No. 15/803,904. (14 pages).

Official Action dated Jan. 23, 2019 From the US Patent and Trademark Office Re. U.S. Appl. No. 15/803,904. (22 pages).

Puri ct al. "Recognition and Volume Estimation of Food Intake Using a Mobile Device", 2009 Workshop on Applications on Computer Vision, WACV, Snowbird, UT, USA, Dec. 7-8, 2009, p. 1-8, Dec. 7, 2009.

Weiss et al. "Automatic Food Documentation and Volume Computation Using Digital Imaging and Electronic Transmission", Journal of the American Dietetic Association, 110(1): 42-44, Jan. 2010.

Office Action and Search Report dated Dec. 24, 2021 From the Israel Patent Office Re. Application No. 269582. (5 Pages).

* cited by examiner

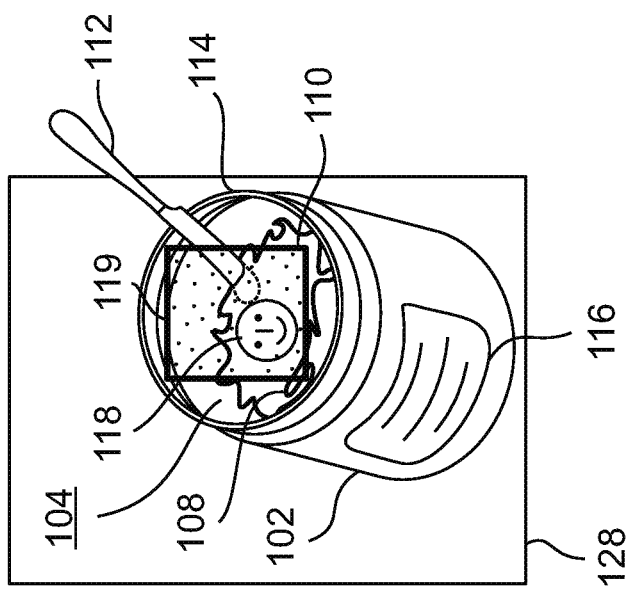
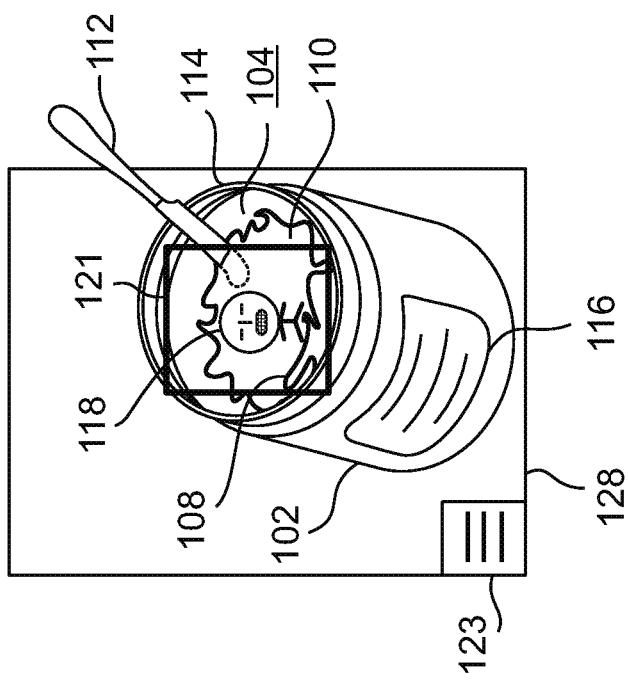
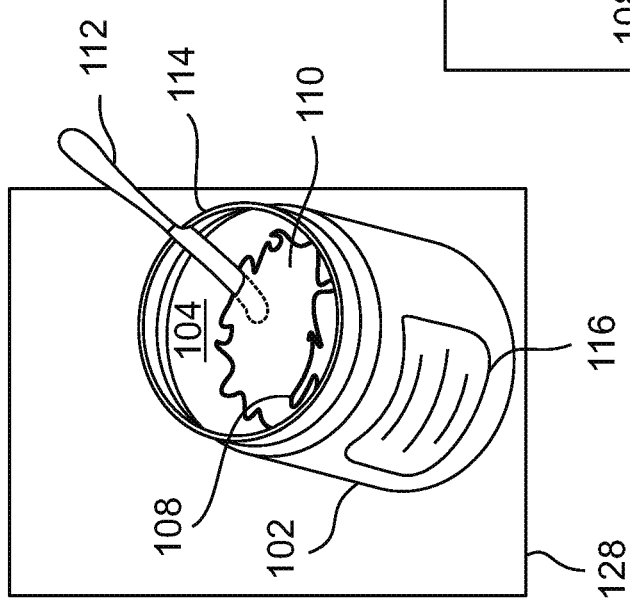

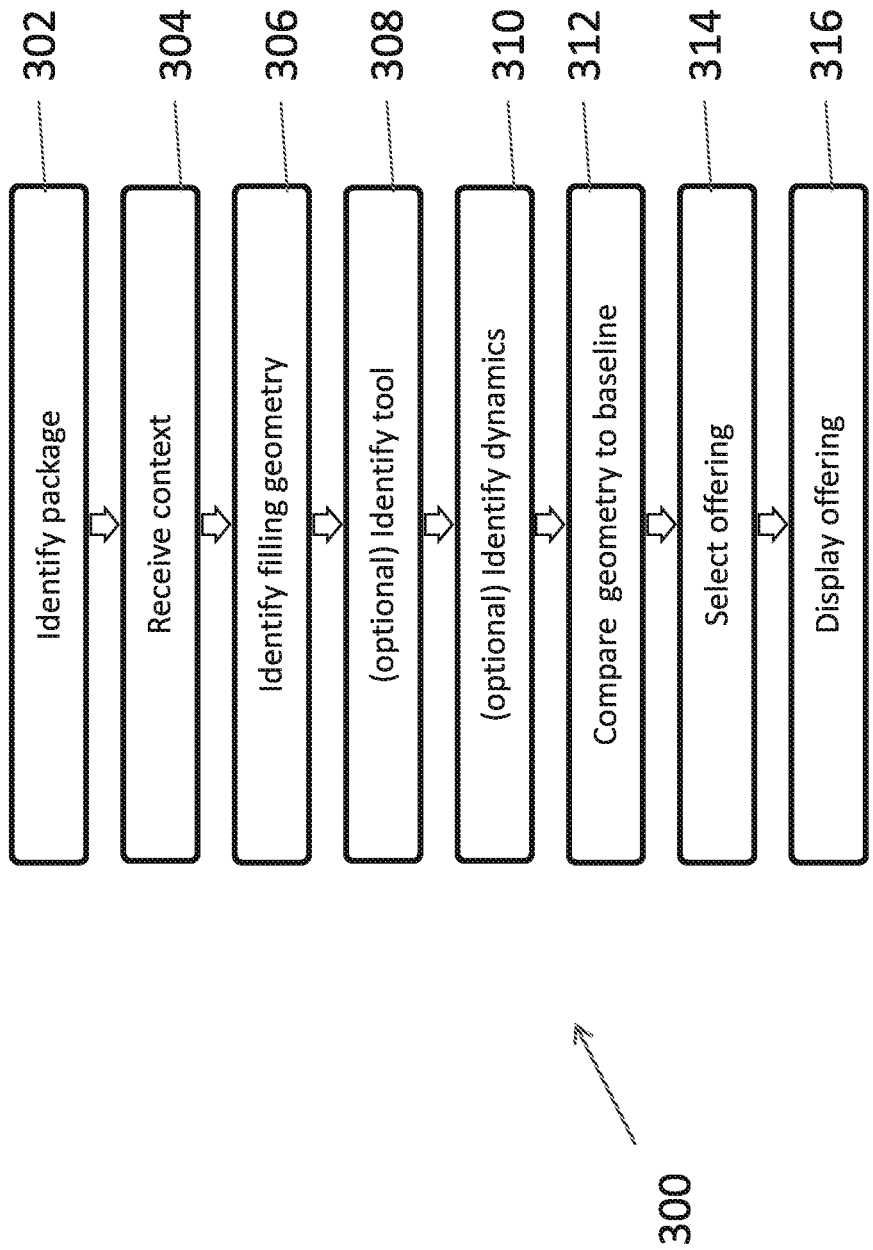

GENERATED OFFERING EXPOSURE

RELATED APPLICATIONS

This application is a continuation of U.S. patent application Ser. No. 15/803,904 filed on Nov. 6, 2017, which claims the benefit of priority under 35 USC § 119(e) of U.S. Provisional Patent Application No. 62/418,232 filed on Nov. 6, 2016, the contents of which are incorporated herein by reference in their entirety.

FIELD AND BACKGROUND OF THE INVENTION

The present invention, in some embodiments thereof, relates to generating offerings based on use of a product and, more particularly, but not exclusively, to generating offerings based on a fill level of a container of the product.

Consumers often use materials, such as foodstuff, provided in containers. Promotions for such containers, when provided, are typically provided on an outside of an enclosure containing the food stuff, inside the enclosure in a separate wrapping, or as a digital or manually entered code.

Additional background art includes: U.S. Pat. No. 9,171,368(B2)—System And Method For Estimating A Quantity Of A Blood Component In A Fluid Canister; WO2016037612(A1)—Apparatus And Method For Recording The Volume Of A Beverage Container Using The Filling Level; JPH1069579(A)—Automatic Charge Settling Device For Eating And Drinking; http://www(dot)ncbi(dot)nlm(dot)nih(dot)gov/pmc/articles/PMC2813222/—Automatic Food Documentation and Volume Computation using Digital Imaging and Electronic Transmission; http://zhiweizhu(dot)com/papers/FIVR_MobileDevice_2009(dot)pdf—Recognition and Volume Estimation of Food Intake using a Mobile Device; U.S. Pat. No. 9,112,960(B2)—Blood alcohol content measurement system powered by an audio signal from a phone; US2016163037(A1)—Estimation Of Food Volume And Carbs; U.S. Pat. No. 8,995,754(B2)—Estimating A Pose Of A Camera For Volume Estimation; U.S. Pat. No. 9,364,106(B1)—Apparatus and method for identifying, measuring and analyzing food nutritional values and consumer eating behaviors; and U.S. Pat. No. 8,345,930(B2)—Method For Computing Food Volume In A Method For Analyzing Food; US2016117952(A1)—Modifying A Person's Eating And Activity Habits.

SUMMARY OF THE INVENTION

The present invention, in some embodiments thereof, relates to generating offerings based on use of a product and, more particularly, but not exclusively, to generating offerings based on a fill level of a container.

Following are examples of some embodiments of the invention. Features of one example may be combined with features of one or more other examples, unless expressly prohibited and form additional examples of some embodiments of the invention.

EXAMPLE 1

A method of reality augmentation, comprising:
(a) determining the identity of a container with a top opening;
(b) acquiring an image of the container from a top thereof;
(c) estimating, by processing circuitry, a geometry of the filling of said container based on said identity and said image; and
(d) overlaying, by a display processor, an augmentation on said image or on a further image acquired of said container, based on said estimation.

EXAMPLE 2

A method according to example 1, wherein said estimating a geometry comprises estimating a fill level of said filling in said container.

EXAMPLE 3

A method according to example 1 or example 2, wherein said estimating a geometry comprises estimating a non-level upper surface of said filling in said container.

EXAMPLE 4

A method according to any of the preceding examples, wherein said estimating a geometry comprises estimating a volume of filling or filling removed, from said container.

EXAMPLE 5

A method according to any of the preceding examples, wherein said filling is opaque.

EXAMPLE 6

A method according to any of examples 1-5, wherein said filling is transparent enough to allow human vision 1 cm in.

EXAMPLE 7

A method according to any of the preceding examples, wherein said filling is spreadable.

EXAMPLE 8

A method according to any of examples 1-6, wherein said filling is in the form of small pieces.

EXAMPLE 9

A method according to any of the preceding examples, wherein said filling is flowable under gravity.

EXAMPLE 10

A method according to any of examples 1-8, wherein said filling flows slower than 0.1 m/s under gravity.

EXAMPLE 11

A method according to any of the preceding examples, wherein said filling comprises a material selected from the group comprising: chocolate spread, soft cheese, nut spread and breakfast cereal.

EXAMPLE 12

A method according to any of the preceding examples, wherein said estimating comprises estimating said geometry by comparing to a baseline.

EXAMPLE 13

A method according to any of the preceding examples, wherein said estimating comprises making measurements on said image.

EXAMPLE 14

A method according to any of the preceding examples, wherein said overlying comprises overlaying on an image portion showing said filling.

EXAMPLE 15

A method according to any of the preceding examples, wherein said overlying comprises displaying said augmentation partially within said filling and partially above said filling.

EXAMPLE 16

A method according to any of the preceding examples, wherein said overlying comprises overlaying on an image portion showing an outside of said container.

EXAMPLE 17

A method according to any of the preceding examples, wherein said augmentation comprises an augmentation selected for a group consisting of a monster or other figure, a coupon, food-related information and a marketing object.

EXAMPLE 18

A method according to any of the preceding examples, wherein said augmentation comprises a still or a dynamic image.

EXAMPLE 19

A method according to any of the preceding examples, wherein said augmentation includes audio.

EXAMPLE 20

A method according to any of the preceding examples, wherein said augmentation is interactive and wherein said processing circuitry detects a physical object interacting with said augmentation after said overlay.

EXAMPLE 21

A method according to any of the preceding examples, comprising detecting the presence of a movable physical object in one of said images and wherein said overlaying comprises overlying in response to a detected position, orientation, motion and/or type of said object.

EXAMPLE 22

A method according to any of the preceding examples, wherein said determining comprises reading a code of said container.

EXAMPLE 23

A method according to any of the preceding examples, wherein said determining comprises identifying said container by shape.

EXAMPLE 24

A method according to any of the preceding examples, wherein said determining comprises identifying said container based on a logo or other human readable visual marking thereon.

EXAMPLE 25

A method according to any of the preceding examples, comprising selecting said augmentation for said overlaying.

EXAMPLE 26

A method according to example 25, wherein said selecting comprises selecting based on a context including one or more of a container id, guessed user of a device used for said acquiring, marketing program, user profile, additional associated user, user input, past interaction with exposures in this or other containers and/or location of purchase of the container.

EXAMPLE 27

A method according to example 26, comprising acquiring at least part of said context using a same device as used for said acquiring.

EXAMPLE 28

A method according to any of examples 25-27, wherein overlaying takes into account a time which passed since a previous exposure for the container and/or a user of said container.

EXAMPLE 29

A method according to any of the preceding examples, wherein said acquiring, said estimating and said overlying are provided by a device with a cellular network connection.

EXAMPLE 30

A method according to any of the preceding examples, comprising tracking said overlaying by a remote server and sending exposure overlay instructions from a remote location, to said display processor.

EXAMPLE 31

A method according to any of the preceding examples, comprising detecting a use of said container by detecting an opening of said container.

EXAMPLE 32

A software component configured for installation on a cellular telephone linked device, comprising:
an image acquisition module;
a package identification module;

a filling geometry estimation module receiving an image form said image acquisition module;

an augmentation decision module receiving geometry estimation information from said geometry estimation module and a package identification indication said package identification module; and an augmentation generation module which generate an image augmentation on an image received form said image augmentation module based on input from said augmentation decision module.

EXAMPLE 33

A system for exposure control, comprising:
a tracking server or cloud configured to:
(a) link packages with exposures to form an exposure plan;
(b) receive information about actual exposures;
an exposure device configured to:
(a) determine that a food material is consumed or manipulated in a manner corresponding to said exposure plan;
(b) generate an exposure;
(c) report said exposure to said tracking server.

EXAMPLE 34

A method of reality augmentation, comprising:
(a) determining the identity of a food material;
(b) acquiring an image of the food material;
(c) estimating, by processing circuitry, a geometry or change thereof, of the food material based on said identity and said image;
(d) determining a consumption or manipulation of the food material based on said estimated geometry or change thereof; and
(e) overlaying, by a display processor, an augmentation on said image or on a further image acquired of said food material, based on said determining.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

As will be appreciated by one skilled in the art, some embodiments of the present invention may be embodied as a system, method or computer program product. Accordingly, some embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some embodiments of the present invention may take the form of a computer program product embodied in one or more computer readable medium(s) having computer readable program code embodied thereon. Implementation of the method and/or system of some embodiments of the invention can involve performing and/or completing selected tasks manually, automatically, or a combination thereof. Moreover, according to actual instrumentation and equipment of some embodiments of the method and/or system of the invention, several selected tasks could be implemented by hardware, by software or by firmware and/or by a combination thereof, e.g., using an operating system.

For example, hardware for performing selected tasks according to some embodiments of the invention could be implemented as a chip or a circuit. As software, selected tasks according to some embodiments of the invention could be implemented as a plurality of software instructions being executed by a computer using any suitable operating system. In an exemplary embodiment of the invention, one or more tasks according to some exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Any combination of one or more computer readable medium(s) may be utilized for some embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium and/or data used thereby may be transmitted using any appropriate medium, including but not limited to wireless, wireline, optical fiber cable, RF, etc., or any suitable combination of the foregoing.

Computer program code for carrying out operations for some embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some embodiments of the present invention may be described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Some of the methods described herein are generally designed only for use by a computer, and may not be feasible or practical for performing purely manually, by a human expert. A human expert who wanted to manually perform similar tasks, such as estimating fill geometry, might be expected to use completely different methods, e.g., making use of expert knowledge and/or the pattern recognition capabilities of the human brain, which would be vastly more efficient than manually going through the steps of the methods described herein.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 2B, 2C and 2D show exemplary displays, in accordance with some exemplary embodiments of the invention;

FIG. 3 is a flowchart of a method of operation of an image capture device of an exposure system, in accordance with some exemplary embodiments of the invention;

DESCRIPTION OF SPECIFIC EMBODIMENTS OF THE INVENTION

Figure 1:
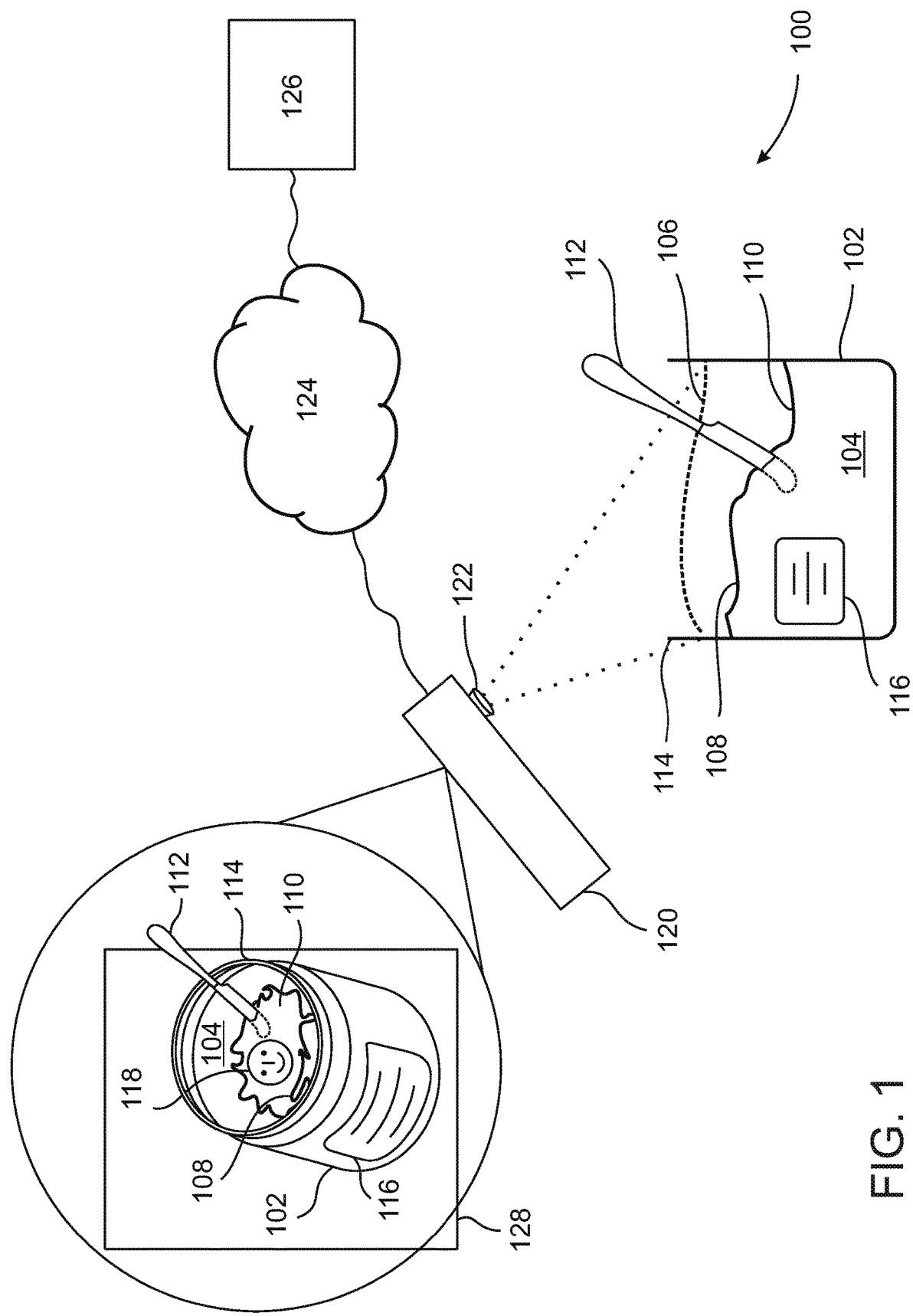
FIG. 1 is a schematic showing of a configuration for generating an offering exposure, in accordance with some embodiments of the invention.

The present invention, in some embodiments thereof, relates to generating offerings based on use of a product and, more particularly, but not exclusively, to generating offerings based on a fill level of a container containing the product, for example, due to consumption or other manipulation of the product.

An aspect of some embodiments of the invention relates to generating an exposure in a container with a filling, based on an identification of a geometry of the filling. In some exemplary embodiments of the invention, the exposure comprises an augmented reality exposure, for example, as an overlay on an image of the container. In some exemplary embodiments of the invention, the augmentation is provided using a cellular telephone, which optionally uses its communication ability to receive instructions regarding the content of the exposure. In some exemplary embodiments of the invention, the filling is opaque. In some exemplary embodiments of the invention, the filling is viscous and is not amenable to simple insertion and removal of an offering to a customer.

In this application, the general term "offering" is used to denote that (e.g., an augmentation) which is presented or available to a user and may include, for example, an advertisement, a coupon, an image, a game, instruction, a token and/or other presentation for example as described herein. In some exemplary embodiments of the invention, a user is offered the opportunity to interact with and/or otherwise utilize the offering.

In some exemplary embodiments of the invention, interaction of a user with the offering and/or filling is detected, for example, spatial juxtaposition of a tool such as a knife with the offering.

In some exemplary embodiments of the invention, the filling is a spread, such as chocolate spread in a jar, and an offering is exposed response to an amount of spread removed from the jar.

In some exemplary embodiments of the invention, the filling is transparent, but as the exposure is a virtual exposure, it cannot be seen until the geometry of the filling changes as appropriate.

In one exemplary implantation, a user images the package using a cellular telephone. The cellular telephone is preprogrammed with what a full container looks like (e.g., in the form of an image template, measurements and/or images, possibly encoded using a machine leaning module programmed to recognize the package). In some exemplary embodiments of the invention, an image of the filling is compared to the preprogramming to identify filling geometry change. Optionally, based on one or more threshold levels defined for the geometry (or states of filling), an overlay is generated showing an item such as a coupon virtual figure or animation. A user can optionally save an image of such generated overlay.

In some exemplary embodiments of the invention, the offering is generated after an image is acquired, for example, if the image is acquired using camera-fitted glasses.

In some exemplary embodiments of the invention, the offering is provided in conjunction with other display devices, for example, VR glasses or whole room holography or 3D display systems. For example, if an imager can image manipulation of the product, a display can be used to show the offering, optionally overlaid on the product itself or on an image of the actual product being manipulated, or on an object associated with the product. In another example, the product is imaged by a cellular telephone and an overlay with an offering generated thereon, but the user manipulating the product is not viewing the product through the cellular phone display. This may be useful if a mother is making a sandwich and a child is viewing and/or otherwise interacting with the offering. The mother manipulating spreading knife may interact with the offering (e.g., an avatar moving to avoid the knife).

In one example, once the product is identified and an exposure is to be generated, the exposure may be linked to an object other than the product, for example, a user's hand or a utensil (e.g., spreading knife) and travel with this object away from a frame where the product is shown (e.g., to a slice of bread being spread or to a virtual location nearby).

In some exemplary embodiments of the invention, usage of the filling is detected based on opening of the package. Optionally, such opening is detected by comparing images of the package to a preprogrammed image.

In some exemplary embodiments of the invention, the offering shown is selected to have an effect on enjoyment of the product. For example, a fruit or other edible item may be shown to evoke a flavor or a smell of fruit in a user's mind.

In some exemplary embodiments of the invention, the offering is an advertisement. In some cases the advertisement is part of a campaign linked to the product by the product manufacturer, distributor or other associate. In some embodiments, the offering is an advertisement which is not associated with the manufacturer. For example, an advertisement for bread may appear when opening a chocolate spread jar (the bread and chocolate having brands belonging to unaffiliated entities).

In some exemplary embodiments of the invention, the product includes both a physical offering (e.g., a sticker or a toy) and a virtual offering. Optionally, the display device can show the virtual offering interacting (e.g., staying near) the physical offering, optionally if the physical offering is near the product.

In some exemplary embodiments of the invention, the virtual offering allows interaction with a remote server, for example, allowing interaction to cause a web site to be displayed and interacted with or a message sent by such manipulation. Feedback from the remote server may be provided by modification of the offering. For example, tapping on an avatar offering may send a message to a web server and a response from the web server may include a display of a web page and/or the avatar changing shape (e.g., wincing).

An aspect of some embodiments of the invention relates to generating an exposure in a solid and/or opaque product, for example, a food product. In some cases, the food is not in a container, for example a loaf of bread or cured meat or cheese, and/or the container is a flexible container, such as a bag. In some exemplary embodiments of the invention, the geometry of the product changes as it is used, and this change is recognized and used to drive exposure generation.

While in some embodiments of the invention the product (solid, opaque and/or in a container) is a food material, in other embodiments it is not, for example, a container of nails, or a tub of grease.

An aspect of some embodiments of the invention relates to dynamic management of an offering campaign, where the actual offerings an end user (customer) is exposed to can be changed dynamically, for example, to match the end user and/or match the needs of a marketing campaign. In some exemplary embodiments of the invention, the offering is a virtual reality augmentation which is selected based on a usage of a product by an end user.

In some exemplary embodiments of the invention, the campaign includes offerings selected based on one or more of demographic, sharing activity of customers, product utilization profile in general and/or for a particular product instance, purchase location and/or ongoing feedback from the campaign.

An aspect of some embodiments of the invention relates to offerings activated by interaction and/or interaction possibility. In some exemplary embodiments of the invention, offerings are shown only (or especially) for products that are within an interaction distance, for example, within reach of a hand, or if the product comes in contact with a user (e.g., a mouth). While offerings may be shown on objects at greater distances, for example, on a super market shelf, at a distance of, for example, 0.5-3 or 4 meters, in some exemplary embodiments of the invention, interaction distance is less than 1 or 0.5 meters form the imager. Distance is optionally determined using a depth sensor, stereo imaging, a depth detection camera and/or using sizes of objects in the image captured by the imager.

In some exemplary embodiments of the invention, actual contact with the user's body is detected or estimated. Optionally or alternatively, actual manipulation and/or deformation by the user's body or handheld instruments (such as a utensil or a game implement) need to be detected for an offering to be activated. In one example, manipulation by a hand is detected by the hand entering a field of view of the imager and recognized by processing of that image. Optionally, the position of the imager is known or assumed (e.g., imager is on glasses) and position and/or sizes of hand-like objects can be determined therefrom. In another example, a food product is detected as approaching a mouth and then leaving the mouth. Again, if the imager is mounted on glasses (or otherwise adjacent a face), the trajectory of such motion can be detected by image processing and matched to expected trajectories for such movement, in order to determine that the product probably came in contact with a mouth and/or was manipulated thereby. In one example, each time a lollipop or ice-cream cone is licked, an offering may be generated. In another example, the imager captures an image of the product, which image includes a face (e.g., using face detection methods) and then it is estimated that the product came in contract with the face. This embodiment may be useful if the imager is held by a different person than the user of the product.

An aspect of some embodiments of the invention relates to sending offerings. While in some embodiments, offerings are generated as part of an advertisement campaign, in some embodiments offerings may be selected by a user and sent as a message, for example to an individual user. In one example, a user selects, in addition to an offering, which products (or objects in general) to include, what manipulations activate the offering and/or a time window where the offering can be activated. This selection can be sent as a message to a VR-enabled imager or other image enhancer of a second user. For example, when the second user views the product, the offering will be activated if the correct manipulation is performed, within the time window. In some embodiments, one or more of the parts of the message are defaults, which are optionally changeable by a user.

In some exemplary embodiments of the invention, the object is actually a human or part thereof, for example, a face or a face of a particular person. Optionally, when the object is a different part of the body, the offering is shown only once the image processor identifies the face and then tracks (e.g., by being in same image or by panning) that the body part is connected to that recognized face.

In some exemplary embodiments of the invention, the message includes an embedded message such as text, animation, video or audio. Optionally, the embedded message is managed as an "easter egg"—being available only if the logic of the message is cracked. In some embodiments, the offering (e.g., animated virtual object) is itself the message.

In some exemplary embodiments of the invention, the message (or a set of messages) includes a plurality (e.g., 2, 4, 5, 7, 10, 20 or intermediate or greater numbers) of products and/or offerings. Optionally, the message may be selected as a theme, for example, defining a set of objects and the offerings generated by interaction with them and/or deformation thereof. Optionally or alternatively, the type of offerings (e.g., which set of animated characters to show) may be part of such a theme. Optionally, the exact offering shown may be determined at runtime and not be pre-set by a user selecting. This may be used to add "magic" to a VR experience. Optionally, a user makes the selection of such a theme for himself.

An aspect of some embodiments of the invention relates to activating a VR enhancement based on estimated contact or manipulation of a user with a viewed object. Optionally, a processor can determine in an image that the object is not only present but also in contact or acts as if it was or is about to be (e.g., based on trajectory) in contact with a user, and this determination activate a VR enhancement. Optionally, the activation also requires that the object be defined by the user (or a tool held thereby).

It is noted that various embodiments of the invention are described with reference to a container with a fill level. Some embodiments of the invention are not limited to fill levels and use techniques and structures described with reference to fill level and exposure based thereon, to exposure responsive to other interaction or change of an object. In particular, some embodiments of the invention relate to change of a surface of a product (or other object), termed herein "deformation", for example, a change in size, shape and/or volume and/or a change in spatial configuration due to bending. Some examples include: a change in size of a sandwich when a bite is taken, a change in shape of an apple when a bite is taken, and a change in volume of an amount of product on a serving utensil. Deformation may also manifest itself in a more 2D manner, for example, a slice of bread is deformed by having a product spread on it. Some embodiments relate to manipulation other than deformation, for example, contact and color change.

A particular advantage of some embodiments of the invention is that by linking an exposure to manipulation and/or change in a surface feature, a more natural (e.g., better alignment with surfaces and/or use) offering may be presented.

A particular advantage of some embodiments of the invention is that by linking an exposure to a particular object, especially a machine made object, it may be easier to more exactly match up (e.g., geometrically) an offering with the object.

A particular advantage of some embodiments of the invention is that by linking an exposure to a part of a product being manipulated/deformed, the offering may be more noticeable by a user and/or a smaller offering may be used to obtain a same degree of attention. Optionally, allowing interaction with the offering is enhanced by the offering already being at or near a point of interaction by the user with the product.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Exemplary Configuration

Referring now to the drawings, FIG. 1 is a schematic showing of a configuration 100 for generating an offering exposure, in accordance with some embodiments of the invention.

A container 102, optionally opaque, and having a filing 104, optionally viscous, such as a chocolate or nut spread, jam or marshmallow fluff, is imaged by an imager 122, which may be part of a mobile device 120. In some exemplary embodiments of the invention, filling 104 is opaque. In some exemplary embodiments of the invention, a geometry 108/110 of filling 104 is imaged, for example, a high fill section 108 and/or a low fill section 110. An original fill level, shown as a dotted line 106 is optionally higher than either of 108 and 110.

Optionally, imager 122 can simultaneously or at a different time image an optional marking 116 on container 102 and/or image container 102 itself. When imaging filling 104, the image optionally includes a rim 114. FIG. 1 shows an exemplary such image 128.

Optionally, imager 122 also images a utensil, such as a knife 112, inserted into filling 104.

In accordance with some exemplary embodiments of the invention, image 128 is an augmented reality image of container 102 and displays an offering 118 to a viewer of image 128. Optionally, the offering is shown as if it were inside container 102, optionally in low fill section 110. In some exemplary embodiments of the invention, the offering and image augmentation are calculated by mobile device 120.

In some exemplary embodiments of the invention, a server 126 connected to mobile device 120 by a network 124, for example, including an Internet, is used to help decide what offerings are shown to a customer, for example, as described below.

In some exemplary embodiments of the invention, marking 116 includes a code associated with the offering. Optionally, the code is individual per container, per container type or per group of similar containers. For example, a same container type may have a different code depending on its distributer.

In some exemplary embodiments of the invention, filling 104 is flowable, for example, a relatively low viscosity fluid or particles. A particular advantage of virtual offerings 118 is that a customer does not need to clean off any of filling 104 which would otherwise adhere to such an offering. Similarly, a virtual offering need not be compatible (e.g., non-reactive) with filling 104 and/or be placed in a sealed pouch. Also, this may simplify assembly of the offering with the container.

Filling 104 is optionally opaque. However, a transparent filling may be used as well. A particular potential advantage of using a virtual offering when filling 104 is opaque is that exposing the offering need not depend on the exact configuration of the filling with relation to the offering. For example, once a certain fill level is reached, an offering may be exposed above the fill level. This may be useful for viscous fillings. A particular potential advantage for transparent fillings is that a user cannot see the offering until filling 104 is properly consumed or otherwise manipulated.

In FIG. 1, two different fill levels are shown. In some embodiments, filling 104 lies flat. In others, it exhibits a more complex geometry. Optionally, for example, as described below, changes in fill geometry other than level may be used to decide on an exposure. Optionally, the orientation of the geometry is noted, for example, using markings on container 102 (e.g., 116) for orientation. In some embodiments and for some filling types, the original fill level is visible (and extracted) from the image based on a mark such filling leaves on the wall of the container.

In some exemplary embodiments of the invention, an interaction between tool 112 and offering 118 can be detected, for example, detecting that offering 118 is touched with tool 112.

Exemplary Method of End User Use

Figure 2A:
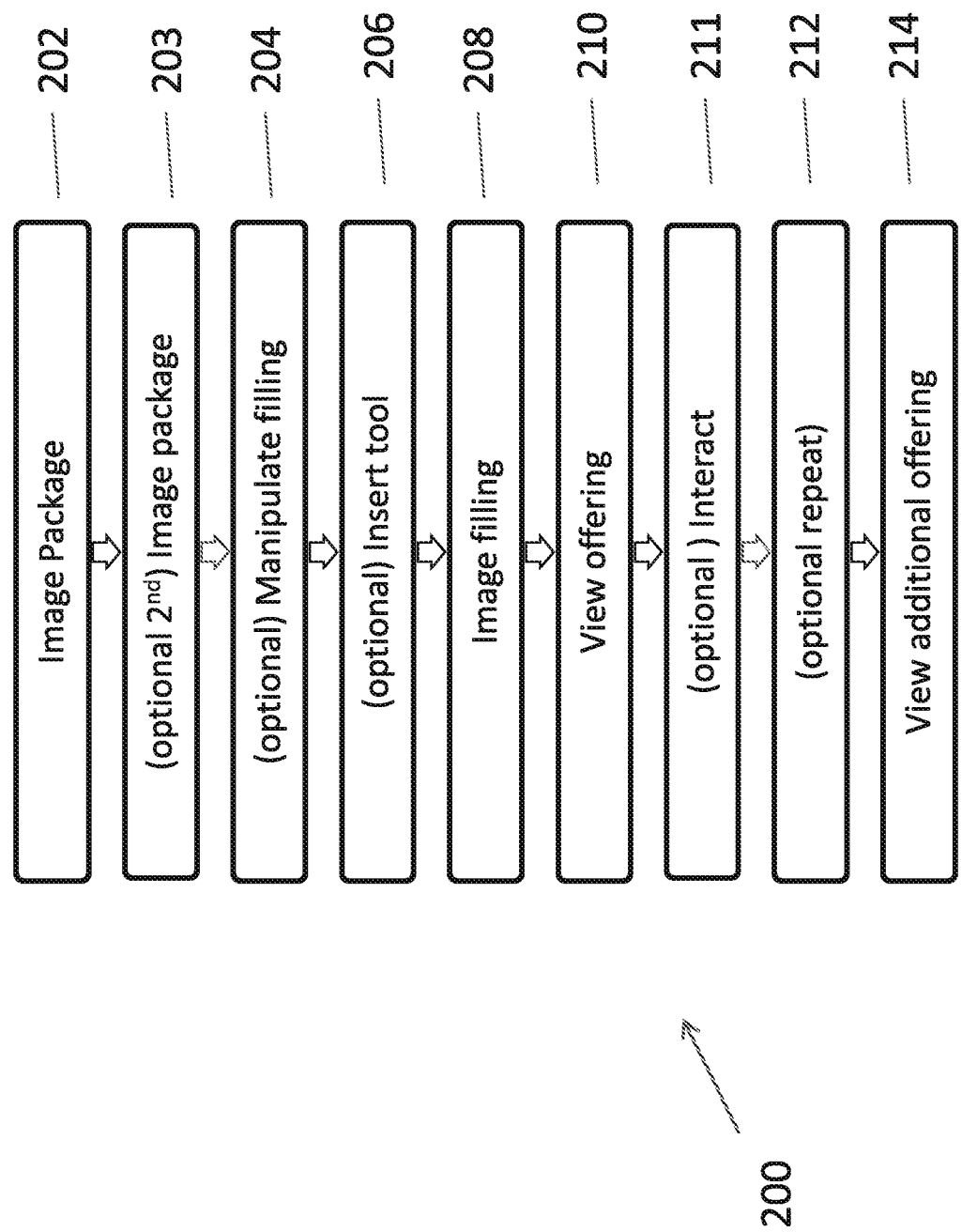
FIG. 2A is a flowchart of a method of using an exposure system by an end user on a container, in accordance with some exemplary embodiments of the invention.

FIG. 2A is a flowchart of a method 100 of using an exposure system (e.g., as shown in FIG. 1 and/or FIG. 4) by a consumer, on a container, in accordance with an exemplary embodiment of the invention.

At 202, the package is identified, optionally by imaging. In some exemplary embodiments of the invention, the user aims a device, such as cellular telephone at the package for such identification. Optionally, the user activates an application after or before such imaging. Optionally, the application is automatically launched by the telephone based on the image, for example, a QR code therein. Optionally, the package includes a machine readable code with, for example, an individual package id or a package type id. In some exemplary embodiments of the invention, the package is identified based on marketing material thereon, such as a logo or printed advertisement or by recognizing printing thereon.

Optionally or alternatively, a user may manually enter a package identification or confirm an identification by the telephone.

In some exemplary embodiments of the invention, the package is imaged a second time 203. Optionally, the first imaging is a profile imaging and the second imaging is from the opening, showing the filling.

In some exemplary embodiments of the invention, package imaging is used to detect use and/or first use of the package. For example, opening of the package is optionally detected by imaging twice, once with a cover on and once without. Image processing is used to detect the lack of cover, for example, based on color change, matching to package imaging (e.g., with and/or without the cover) and/or by identifying an opening in the package.

In some exemplary embodiments of the invention, the package is sealed and the imaging is used to detect the breaking of the seal (e.g., removal of a shiny plastic wrap, removal of an inner seal and/or breaking of a part of the cover). Various image processing techniques may be used to detect changes in the package cover and/or seal, including, for example, image processing functions that are automatically selected according to the package identification.

In some exemplary embodiments of the invention, package opening is used as proof that the product was used.

In some exemplary embodiments of the invention, package opening is used to start a timer, for example, to track when and how often filling is used, which may be used as part of tracking program or to select the offering to be exposed. Optionally or alternatively, package opening is used to detect/guess a change in user. Optionally or alternatively, package opening is used instead of filling manipulation to decide on showing an offering. Optionally, the number and/or timing of such openings is tracked and/or counted. Optionally, an exposure is shown based on the rate and/or frequency of use and/or lack of long durations (e.g., above a threshold) where the package was not opened.

In some exemplary embodiments of the invention, a first virtual offering (possibly only an image) is shown when the package is imaged and/or opened, and a further one may be shown when filling reaches a correct geometry. In one example, opening the package allows a user to interact with the image and expose offerings on the image itself, rather than on the filling.

In some exemplary embodiments of the invention, package opening allows an offering to be shown on the outside of the package, but such showing requires first opening the package.

At 204, the user optionally manipulates the filling in the package (if it is a container) or the package itself (if it is solid food, for example bread, fruit or cured meat). Optionally, manipulating includes removing and/or moving around parts.

At 206 the user optionally inserts a tool, for example, a knife, into the package. Optionally, this tool is used for manipulating. While some embodiments detect a new state of geometry, some embodiments can detect a change in geometry caused by the tool. Also, some embodiments detect movement of the tool, for example, indicating interaction with the package or an augmentation displayed.

At 208 the user images (e.g., using the same cellular telephone) the filling of the package, so that its geometry can be viewed and analyzed.

At 210 an offering in the form of a virtual augmentation is generated and displayed to the user overlying an image of the package and/or filling. In some embodiments, such offering can then be shown at other locations. Optionally or alternatively, the user saves the offering (e.g., by clicking on it) or saves an image which shows the offering.

At 211, a user optionally interacts with the offering, for example, saving it, clicking on it to reach a web site and/or other interactions. In some exemplary embodiments of the invention, after viewing the offering the user is required to image part of the package (e.g., the label) and then may be given a more substantial and/or usable offering. In one example, such imaging reads a computer readable code off the label and causes the sending of a message to a company running or otherwise associated with the campaign, e.g., based on the contents of the label.

In some cases, second imaging of the package is needed if the information on the package spans more than, for example, 120 degrees of circumference. Thus, a first imaging can identify the package but a second imaging is needed to read a particular code.

In some exemplary embodiments of the invention, imaging 202 is delayed until after an offering is shown. Such offering may be based, for example, on a geometry of the filling and/or on considerations not related to product consumption, for example, telephone ID.

At 212 and 214, the process of manipulating and viewing an offering may be repeated, for example, immediately or at a later time. In some cases the offerings change based on time, order of presentation and/or geometry. In some cases an offering takes time to regenerate.

In one example, the package is a container of soft cheese typically full to within 1 cm from a rim thereof. When a user removes half of the cheese and images the container again, this reduction in fill level is identified and a coupon may be shown overlaid on the image of the cheese. For example, a coupon to purchase more cheese may appear. Optionally, the coupon appears if the cheese is consumed fast enough (e.g., based on time since purchase or time since a previous use) and/or at certain time windows.

Exemplary Offerings and Exposures

Below are some examples of features an offering may have. Any particular offering may include one or more, such as 3, 5 or more of these features.

In some exemplary embodiments of the invention, an offering is exposed inside the package, for example, inside (e.g., partially hidden) or above the filling. Optionally or alternatively, an offering is exposed on the container, for example, its outside or a rim or an inner surface.

In some exemplary embodiments of the invention, an offering is a part of an ongoing game, for example, comprising a token or figure (e.g., a monster) to be collected. Optionally or alternatively, the offering comprises a coupon. Optionally or alternatively, the offering comprises nutritional values and/or other food related information, such as recommendation of serving sizes and/or advantages. In some exemplary embodiments of the invention, the offering comprises a code to unlock other items, for example, software such as a game or game level on a telephone, a contest or access to or actual money or other payment means. Optionally or alternatively, the offering causes loading or unlocking of a game on the cellular telephone.

In some exemplary embodiments of the invention, the offering allows a game to unlock or be used while the container or filling stay in view (e.g., tracking the container using a cellular-telephone imager) or for a short time afterwards.

In some exemplary embodiments of the invention, the offering comprises a power-up or other item to be used in a game, the game optionally installed on the cellular telephone.

In some exemplary embodiments of the invention, the offering comprises a primer for a location based game, for example, the game being responsive to both package location and package filling manipulation.

In some exemplary embodiments of the invention, the offering includes instructions for interacting with and/or utilizing the offering. In some exemplary embodiments of the invention, the offering comprises a link to an internet web site and/or activates an application on the cellular telephone and/or forms a communication channel and/or initiates a communication.

In some exemplary embodiments of the invention, the offering comprises dietary recommendations, such as a serving size or a reminder or suggestion as to how much product to use and/or what other products to use it with and/or how to use the product. Such suggestion may be, for example, health based, caloric based and/or recipe based. Optionally, the suggestions are provided from a remote server with a database of suggestions for various situations. Data from the imager device (e.g., cellular phone) and/or other data about a user, may be used to generate and/or select a suggestion. Optionally, the suggestion depends on the manipulation of the product, for example, based on an estimated amount removed from the product by the user or the size of implement being used (e.g., tablespoon vs. teaspoon) as may be imaged and/or recognized form an image captured of the product and/or utensil, for example, by image processing.

In some exemplary embodiments of the invention, once the offering is exposed, it stays visible (e.g., when using an augmented reality system). Optionally, the offering persists for a set periods of time, such as 1-120 seconds, 1-120 minutes, 1-120 hours and/or 1-5 weeks, or longer. Optionally, the offering stays visible longer if interacted with by a user or if a user interacts with an associated tool, such as a web site or remote server.

In some exemplary embodiments of the invention, the offering is only visible once or for a small number of times (e.g., separate viewings of the container and/or filling). For example, 2, 3, 4 5, 10 or intermediate or greater number of times. Optionally, the offering is visible only as long as the package is imaged, optionally, with some leeway (e.g., between 1 and 300 seconds) if the viewing device is moved away or is switched off.

In some exemplary embodiments of the invention, the size and/or location of an offering is based on measurements taken in the acquired image, for example, measurement of the container, product, utensil and/or product fill level. Optionally, the measurements are calibrated for a package size, for example, based on a known (stored in memory) size of a jar. Optionally or alternatively, the offering is dynamically scaled to match one or more features in the image, for example, jar opening size.

In some exemplary embodiments of the invention, an offering, once viewed and disappeared, can be revived, for example, by interacting with a remote server. Optionally or alternatively, an offering can be saved on the device used for viewing.

In some exemplary embodiments of the invention, an offering can be transferred to another object, such as a different package.

In some exemplary embodiments of the invention, for example for cereal, a user images a cereal package to obtain a package identification and/or fill level in the package, by the offering is shown in a bowl used to eat the cereal. Optionally, the user images the cereal box and then images the bowl (empty or full) and the exposure is generated in the bowl, optionally after at least some cereal therein is eaten (e.g., its filling geometry changed, possibly by reducing filling level).

In another example of a transfer the package identified is a package of bread and the exposure is on a sandwich, optionally after it is practically eaten. Optionally, a guardian or other user links the sandwich to the package, for example, using an interface in a cellular telephone. For example, imaging the package to identify it, then imaging the sandwich and activating a link. Optionally, such a link is transferred to a child's telephone so that when the child images the same sandwich, an exposure can be generated, for example, after practical consumption thereof.

In some exemplary embodiments of the invention, an offering can be covered up by a user, for example, by modifying the geometry of the filling. Optionally, this makes the offering (or the offering may change it appearance and/or function) visible again, for a next user or for the same user at a later time. Optionally, once the offering is used (for such offerings) the offering imagery changes. For example, a coupon may be used up, while an advertisement may remain unused even if viewed.

In some exemplary embodiments of the invention, the visualizing and/or function of an offering change, for example, due to one or more of exposure time, other exposures, interaction and/or repletion. Optionally, such changes are tracked on the user device (e.g., cellular telephone) and/or a remote tracking server. Optionally, what is tracked is a count of exposures. Optionally, such a count is linked to an identification of the package, for example, via a package id thereof and/or to one or more of package geometry, interaction and/or user. Optionally, all the packages of a same type share a same id, for a particular user. Alternatively, at least some packages may have a different id, optionally with a different id for each individual package.

In some exemplary embodiments of the invention, an offering comprises an image, optionally a 2D projection of a 3D image or a 3D rendering (e.g., for stereoscopic or other 3D viewing techniques). In some embodiments, the offering is a 2D image.

In some exemplary embodiments of the invention, the offering is dynamic, for example, being animated, optionally according to a sequence. Optionally or alternatively, the offering comprises a video clip or a series of images.

In some exemplary embodiments of the invention, the offering is shown floating above the filling. In some exemplary embodiments of the invention, the offering is shown conforming to surface geometry or intersecting with the surface and/or resting on the surface. Optionally, hidden parts, such as lines, of the offering (e.g., as would be expected to be hidden by the filling) are not displayed.

In some exemplary embodiments of the invention, the offering is positioned according to the filling geometry or container geometry, for example, at a fixed distance from the container wall (and/or recess in filling), and aligned with an orientation of the container (e.g., as determined by imaging of a label thereof).

In some exemplary embodiments of the invention, a linkage is made between one or more offering display and/or manipulation parameters and dynamic consumption of a product. In one example, the offering changes according to dynamic consumption patterns of the product (e.g., as the product is consumed) and/or as the product is manipulated.

In some exemplary embodiments of the invention, where the offering is dynamic, the offering may move along and/or oriented to features of the container, for example, a monster may travel along the wall of the container and/or along an edge in the filling.

In some exemplary embodiments of the invention, the filling is non-uniform, for example, a spread including chunks or pieces of fruit and the offering is linked to such. Optionally, the image of the filling is analyzed to detect such features or objects and the offering is positioned according to such detected features or objects. For example, in cereal, an offering may be linked to a piece of dried fruit or a spoon handle. In another example, an offering may be linked to watermelon seeds in a watermelon. In some exemplary embodiments of the invention, position is at a fixed distance and/or orientation. Optionally or alternatively, the detected object is used to define a size and/or behavior of the offering, for example, to have the image in the offering surround the object or pretend (e.g., graphically) to lift the object. In some exemplary embodiments of the invention, a remote server store s (e.g., in non-volatile computer memory) possible objects to be searched for and/or templates or code for recognition thereof, in association with package id, campaign and/or offering types.

In some exemplary embodiments of the invention, the offering includes audio, for example, sounds, music and/or speech. Optionally, such audio is provided even if no offering is visible, for example, as part of a guidance to search for the offering, e.g., as in a "hot/cold" game, where one sounds means searcher is getting close and another means searcher is getting far. Optionally, the audio is modified and/or synchronized with dynamics of the offering. In one example, the offering graphically pretends to dig itself out of the filling and the audio corresponds to such self-extraction attempts. In some exemplary embodiments of the invention, user interaction is with the display even if no offering is shown. For example, a user may tap a search location on the screen and an offering may appear at that point or a different part of screen, for example, at a location anchored to the package image or image of filling.

In some exemplary embodiments of the invention, the user device (e.g., cellular telephone) is used to interact with the offering, for example, the device receiving speech input from the user or touches or clicks on the screen showing the offering. Optionally, the offering can use the telephone to generate audio and/or visual signals as part of an interaction, as well as independent of user input.

In some exemplary embodiments of the invention, an offering is considered exposed when visible. In some embodiments a user must interact with the offering, for example, via the device or via a physical element placed at or near where the offering is imaged.

In some exemplary embodiments of the invention, viewing an offering is a team effort, in which two or more users must participate. In one embodiment, the two users view the same package and one views an offering while another interacts with it.

In some exemplary embodiments of the invention, the tracking server generates an offering only if two telephones report looking at a same package id. Alternatively, the two users are not co-located. Optionally, one views the package and another, possibly via a web site or other internet-connected application shares the view and/or interacts therewith. In another embodiment, the other user interacts with a same or similar type of package (e.g., both interact with peanut butter). Optionally, the offering is exposed responsive to their shared interaction (e.g., digging in chocolate spread with a knife).

Exemplary Displays

Cellular telephone 120 (or device 402 of system 400 in FIG. 4, in general) can show various displays based on user input, other input and/or decision logic, for example, as a process of exposure progresses. This may also affect what types of interaction a user may have with the system (e.g., 400) and/or system response to such interactions.

FIGS. 2B-2D show exemplary displays, in accordance with some exemplary embodiments of the invention.

FIG. 2B shows a display where no augmentation is presented. This may correspond to a pre-exposure state. Optionally, a menu or menu control (not shown) is provided, so a user can interact with the exposure system, for example, to identify one's self. Optionally, the display includes an indication of the identified package and/or an indication that the exposure system is active (e.g., is imaging an item on which an exposure may be offered).

In some exemplary embodiments of the invention, an area of recommended interaction is displayed, for example, to encourage the user to interact with that part of the image and/or the corresponding part of the package/filling, for example, to cause an exposure of an offering.

FIG. 2C shows a display with an offering 118. Optionally, a new active area 119 is created on the screen (indicated as a dotted area, surrounded by a line). Optionally, if a user touches this part of the display, he activates the offering and/or otherwise interacts with it. Optionally, a menu item or other control is shown responsive to such interaction and/or before such interaction.

FIG. 2D shows a display where offering 118 has changed, for example due to self-animation or in response to user interaction. A menu or other control 123 is shown as well. Optionally, active area 119 changes to a differently located and/or sized active area 121, which may indicate, for example, locations where a user can interact with the modified offering 118.

In some exemplary embodiments of the invention, interaction with on offering includes saving the image and/or indicating that the offering was noticed.

In some exemplary embodiments of the invention, active areas on the screen are indicated as such. In other embodiments, at least some active areas are not visually (e.g., graphically) delimited.

In some exemplary embodiments of the invention, (not shown) the display also includes instructions to a user, for example, what to image next, how to interact with the offering and/or a list of possible containers being images. In some exemplary embodiments of the invention, the instructions shown match a state of the system, for example according to acts in FIG. 2A.

Exemplary Context Generation

The offering to be shown may be selected by and/or generated responsive to desires of one or more actors. For example, the exposure may depend on a marketing manager, manufacturer, distributer, importer, user and/or guardian thereof. In some exemplary embodiments of the invention, one actor defines a set of available offerings and another actor defines a subset (or rules for generating such) to be actually used. For example, a manufacturer may approve a first set of coupons and a guardian (e.g., parent) may select a subset thereof as being suitable for a user.

In a general sense, an offering and/or a logic for controlling selection, generation, interaction with and/or other behavior of the offering or exposure, may be selected based on context of the user interaction with the package.

Figure 2E:
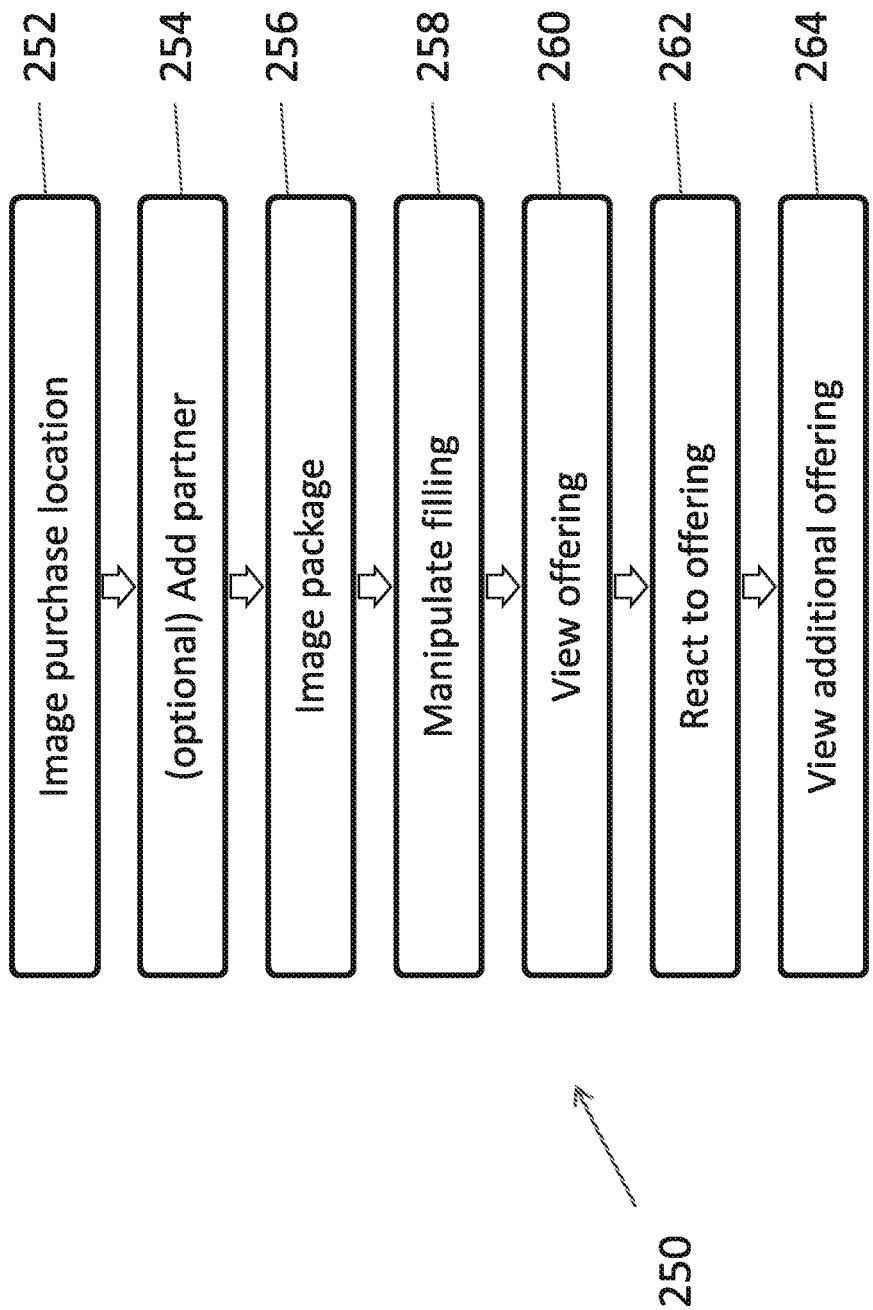
FIG. 2E is a flowchart of a method of context generation for using an exposure system by an end user, in accordance with some exemplary embodiments of the invention.

FIG. 2E is a flowchart 250 of a method of context generation for using an exposure system by an end user, in accordance with an exemplary embodiment of the invention.

A 252, a purchase location is optionally imaged or otherwise linked with a product, for example, by manual data entry, RFID tracing of the product and/or GPS or other positioning method of a user device such as a cellular telephone. Optionally, what is entered is not an actual location but a name of a brand or a landmark (e.g., a prominently displayed logo or a digital code such as QR code). Optionally or alternatively, what is entered is a code, such as found on a coupon. Optionally or alternatively, a used links a context other than location with the package, for example, a recipe, a game or a marketing plan. Such linking may use digital code reading by the cellular telephone, in temporal proximity or in sequence with package imaging. Optionally or alternatively, such data is manually entered.

At 254, a second user is optionally added, for example, by being collocated and the devices of the two users forming a link or via a wireless (e.g., internet) link between the two users, and some indication of the shared item.

At 256 the package is imaged.

At 258 the package and/or or its filling are optionally manipulated and/or imaged to determine if and/or what to generate as an offering exposure.

At 260, the offering is optionally viewed by one or more user. In some embodiments, the offering is identified by software on the device and no user viewing is actually required, though the offering is optionally displayed.

At 262, a user optionally reacts to the offering, for example, by selecting it or otherwise interacting with it.

At 264, a new offering is generated for viewing in response to one or more of the viewing and reaction. This may be in addition or instead of the existing offering reacting to the user's interaction.

As can be appreciated, the various types of context may be used, for example, for personalization of experience and/r personalization of marketing. In one example, the demographic decides what type of offering is made, for example, soccer player images, monster images or baseball images. In another example, a store owner, chain owner, local distributor and/or manufacturer may have input into the specific offerings made so as to advance a certain marketing plan. In another example, tie-ins are enabled by a user entering a code, such as on a coupon or a location, which then ties with specific offering sets.

In some exemplary embodiments of the invention, for example where a typical marketing target is children, guardian input (such as providing a telephone ID or install id or user name and a request) can be used to prevent undesirable offerings from being shown to the children (e.g., age inappropriate) or enable the presentation of desired offerings (e.g., encouragement to eat healthy food).

Some Exemplary Exposure Modification Due to Various Inputs and Context

Following is a non-exhaustive list of exemplary exposure modifications, one or more of which may be realized using virtual offerings according to some embodiments of the invention.

As noted herein, the logic of the exposure (e.g., whether to generate an exposure and/or under what conditions) and/or its image or other behavior may be dependent on various inputs. Optionally, such determination is made by user device 402 and/or a server portion of system 400.

In some exemplary embodiments of the invention, various inputs are used to determine how the offering should change during exposure thereof (e.g., animation or response to interaction).

Optionally or alternatively, the inputs are used to select a logic of response to interaction.

In some exemplary embodiments of the invention, user location, for example, determined using GPS, WiFi signals and/or cellular base-station data, is used as an input.

In some exemplary embodiments of the invention, the environment (e.g., indoors/outdoors for example as detected by cellular telephone sensors), vibration, temperature, light level, movement speed, location at a residence or at a store or at a school and/or other environmental measurements are used as an input.

In some exemplary embodiments of the invention, the package identification, user identification or other data and/or or device identification (e.g., processing and/or display abilities) are used to modify an exposure property.

In some exemplary embodiments of the invention, what is modified is a logic under what fill conditions to show an exposure. Optionally, the logic is in the form of a function which is selected from a set of functions and/or in the form of one or more parameters which may be calculated and/or selected from a list in memory. Such modification and/or selection methods may also be applied to other exposure related behavior, such as image, interaction logic and timing logic.

In some exemplary embodiments of the invention, what is modified is a size and/or shape of interaction areas.

In some exemplary embodiments of the invention, what is modified is displayed instructions and/or menus.

In some exemplary embodiments of the invention, what is modified is offering contents.

In some exemplary embodiments of the invention, what is modified is offering dynamics and/or times (e.g., display time, time until display).

In some exemplary embodiments of the invention, what is modified is offering dynamics.

In some exemplary embodiments of the invention, what is modified is age-matching, for example, font size and/or image type.

Some Exemplary Potential Advantages of a Virtual Offering Over a Real Offering

Following is a non-exhaustive list of potential advantages, one or more of which may be realized using virtual offerings according to some embodiments of the invention.

As the offering is virtual, customers have no incentive to vandalize packages to extract offerings.

As the offering is virtual, offerings can be created and/or changed without the need to make any changes in a manufacturing process. In some embodiments, the label is changed or a sticker with a code added (possibly by a retailer or other post manufacturing step). It is noted, and optionally provided in some embodiments, that offerings can be changed (or added) post manufacture and even post purchase and/or even after consumption has started.

As the offering is virtual, some type of offering or display can be provided even before the package is opened and/or displayed. This may be useful to encourage potential customers to spend more time examining a package. The actual offering may be linked to what is displayed before purchase. For example, the outside of the package may trigger a display of a probability of finding a certain offering therein and/or terms of use (e.g., how fast one needs to consume product to view a certain offering).

Interaction with food can be encouraged, especially if new offerings or old offerings can be exposed after an initial exposure. Optionally or alternatively, the use of dynamic and/or interactive offerings and/or offerings using multiple users can encourage such interaction.

In some exemplary embodiments of the invention, the campaign manager can modify the location where the offering is exposed at, for example, modify the depth of exposure relative to the filling, or location (e.g., in polar coordinates) relative to package. Optionally, such modification is automatic, for example using a pre-set modification logic and/or by selecting modification logic, for example, based on user identity and/or behavior.

Virtual offerings can be livelier than physical offerings and by using augmented reality a user is not required to stop viewing the product while interacting with the offering.

Virtual offerings can be personalized according to the desires and/or sensibilities of any actor in the supply chain.

Virtual offerings can track the history of a user's interaction with offers and/or products and thus provide a more personal and/or adapted experience.

Virtual offerings are more flexible with respect to packaging and filling types. In one example, a virtual offering can be used with a transparent or semi-transparent filling, such as water or juice (in which case filling level may be determined form outside the package as well). In another example, a virtual offering is associated with a solid product, such as hard cheese, fruit or cured meat. Inserting an offering in such cases may be undesirable, but a virtual offering can be generated responsive to a change in geometry thereof. In case of a solid product, the packaging may be, for example, flexible, formfitting, or non-existent.

It should be appreciated that some of these advantages may be provided also with virtual offerings that are not linked to the geometry of a filling of a package, but rather to a package as such and/or consumption as such (e.g., juice level in a glass).

Exemplary Operation

As can be appreciated there are multiple methods of identifying a filling level or geometry and/or change thereof in general and/or identifying the insertion of a solid object to interact with a virtual offering, which may be used in accordance with some embodiments of the invention.

FIG. 3 is a flowchart 300 of a method of operation of (circuitry of) an image capture device of an exposure system, in accordance with some embodiments of the invention.

At 302, the package is identified, for example, using OCR, reading a bar code or other digital code or applying pattern matching on content of the label and/or shape of the package. In some embodiments, a user confirms a suggestion by a computer as to the identification and/or selects form a list of possibilities or enters his own choice.

Depending on the embodiment, the identification may optionally be of a package, subset of packages and/or of a particular package. In some cases, codes are reused between packages, but geographical and/or temporal distribution of the packages make it unlikely for a user to purchase two packages with a same code. In some exemplary embodiments of the invention, the package is identified based on a combination of two features, for example, shape and code. Optionally, the code is used to narrow down the shapes of packages which need to be identified. In some embodiments, a same code is used for different packages, and by using two identification marks, a particular package id can be determined.

In some exemplary embodiments of the invention, the code is provided on an added label, optionally added by a distributor or store.

In some exemplary embodiments of the invention, the identification is at a point of use, for example, a kitchen counter. In others, identification may be used at a shopping location, for example, to allow the provision of a preview offering on one or more packages.

At 304 the context of the potential exposure event is collected, for example, as described in FIG. 2E and/or based on information on a user's cellular telephone.

At 306, the geometry of the filling is optionally determined. Optionally, methods as in the publications in the background are used. Optionally or alternatively, the filling is identified based on its color and/or other visual characteristics, optionally stored in association with the exposure. In one example, a cellular telephone images a container from on top. The color of the container walls is separated from the color of the filling. The size (in the image) of the container rim and the filling can be extracted using clustering to cluster the two colors in to shapes which are measured. Based on a knowledge of the cellular telephone imaging geometry, the fill level can be determined (e.g., based on a distance of the filling level from the rim). More complex geometry can be determined using structured light methods known in the art and/or stereoscopic imaging (e.g., using images from two separate locations, for example, as captured while video imaging with a moving camera, even if the camera moves a small amount, or using dual cameras), built in range finders and/or based on image analysis of reflections and shadows in the filling. Various methods of identifying surface geometry are known in the art of image processing and may be used, for some embodiments of the invention.

In one example, what is searched for is a shape of the filling, for example, a mound or a depression, which can, for example, indicate digging.

In some exemplary embodiments of the invention, the package identification provides a size calibration (e.g., by association of package and/or filling geometry details with the offering) for determining distance and/or image feature sizes. Optionally, such information is electronically provided by a server to a device which is capturing and analyzing the image.

In some embodiments, the filling and package have the same geometry, for example, in the case of a loaf of bread and geometry (size and/or ratios of sizes) thereof is optionally determined using imaging methods, for example, such as known in the art of geometrical measurements using imaging.

In some exemplary embodiments of the invention, image analysis is carried out by human operators (e.g., to which an acquired image and/or relevant conext or other data is provided), for example, such as provided by the Amazon Mechanical Turk service whereby small jobs are given to temporary works on a piecework basis, or using hired workers In some embodiments, the filling is not of the original package. For example, in the case of a bowl of cereal, imaging is used to determine a fill level of the bowl. Optionally, the bowl is pre-marked by a sponsor so its size and/or geometry is known and/or includes fill markings thereon. Alternatively or additionally, "before" and "after" images can be compared to identify changes in fill level and/or geometry. In one option, a user aligns the image acquisition system to match a previous image or indication (e.g., of the rim) on a screen and then a decision is made by comparing that image to a previous image or to a rule (e.g., expected color at a location in the image).

At 312, an exemplary method of change determination is optionally provided, whereby a baseline image is compared to a current image. The baseline image may be provided as part of the offer generating data or may be based on previous acquisition by the device. In either case, detecting change based on differences between the images may be used to guide offering exposure.

At 308, a tool is optionally identified in the image, for example, a spoon, optionally at a location where an exposure is made.

At 310, dynamics are optionally identified, for example, swirling of food, pouring of food, moving of food parts (e.g., bread slices) and/or movement of a tool (308), for example a gesture created by the movement or an indication of interaction of the tool with an offering (e.g., stabbing) or part of the food (e.g., indicating digging).

At 314 the offering is selected, for example, based on data provided by any and/or all of 302-312, for example, according to rules of a marketing plan previously set up.

Exemplary System Configuration

Figure 4:
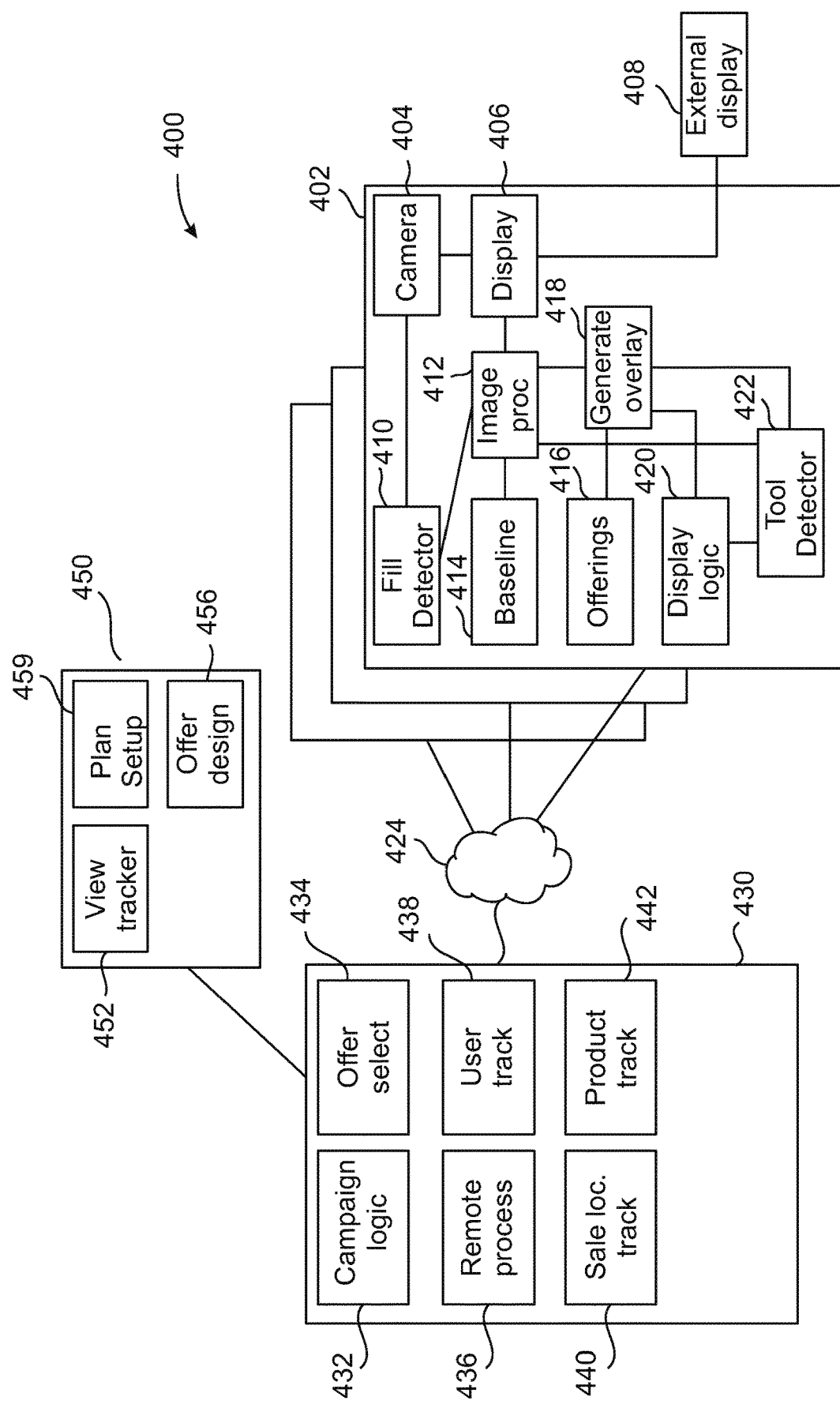
FIG. 4 is a schematic block diagram of an exposure system, in accordance with some exemplary embodiments of the invention.

FIG. 4 is a schematic block diagram 400 of an exposure management system, in accordance with some embodiments of the invention. It should be appreciated that other geometries can be used and that items indicated as being in a single module or unit may, in fact, be implemented in a distributed fashion, for example, on a set of servers on the "cloud".

As a general scheme, system 400 includes one or more user devices 402 (such as suitably programmed cellular telephones, optionally connected by a wiles link 424 to a server 430. It is noted, however, that the functions of the server may be carried out on device 402. A campaign user (e.g., a marketer) may have his own device (e.g., a server or client or stand-alone unit 450) which provides information to and receives information from server 430. In some embodiments, unit 450 is light weight client or other client using server 430 to carry out some or all of the functions described herein for unit 450.

Device 402 may be, for example, a cellular telephone, tablet (e.g., including phablet) computer, laptop, devices for projecting image data into the eye or nearby where it is viewed, devices which project an image onto the field of view (e.g., the package), glasses which can show an overlay of data, VR glasses (e.g., which show a scene and other light is blocked), augmented reality glasses, where a scene is overlaid on an image viewed through a transparent part of the glasses and/or glasses with an imager (and optionally no display). In some exemplary embodiments of the invention, the device is portable by hand (e.g., weighs less than 5 Kg. Optionally or alternatively, the device is worn.

In some exemplary embodiments of the invention, device 402 includes a camera 404 for capturing an image of the filling and a display 406, for example for user interaction and/or for exposing the offering, optionally with or without an image being augmented. In some exemplary embodiments of the invention, an external display 408 is used. This may be useful, for example, if the user is using glasses with an imager (such as snap glasses) and can use the external display for viewing and/or manipulating the offering. Some glasses, such as Google Glasses can be used for both image capture and augmentation display, as can frames in which a cellular telephone is placed, and worn on the face (and used for VR or augmented reality). In some exemplary embodiments of the invention, the external display is worn, for example, being a head mounted display or a wrist display (e.g., a smart watch). In some exemplary embodiments of the invention, an external display is used for interaction (e.g., menus) while the exposure is shown as a virtual augmentation on a different display, such as that of a cellular telephone. When two or more users cooperate (e.g., with linked devices), optionally one has a device used for reality augmentation and the other has a device used for interaction.

In some exemplary embodiments of the invention, device 402 includes an image processor circuit 412, which, for example, uses a fill detector 410 and/or a baseline image/data storage 414 to identify fill geometry change and/or state. Optionally, a tool detector 422 is provided, for example, to detect a spoon and including, for example, circuitry programmed and/or otherwise configured to detect a utensil in the image.

In some exemplary embodiments of the invention, an overlay generating circuitry generates an offering to be displayed, for example, being added by image processing circuitry 412 to a previously captured image for display 406. In some exemplary embodiments of the invention, an offering store 416 and/or display logic (e.g., storage and/or rules) 420 are used by circuitry 418 to decide what offering to generate.

Server 430 is optionally used to provide processing power where devices 402 cannot provide it and/or where central control is desired. Optionally, an offer selection module 434 selects the particular offer to be shown on device 402. Optionally or alternatively, module 434 is used to generate an offer package including data needed by device 402 to select the offer, for example, as noted above.

In some exemplary embodiments of the invention, server 430 includes a campaign logic module which stores campaigns and helps determine which offers to make to which users at which times based on such stored logic.

In some exemplary embodiments of the invention, server 430 includes a user tracking module for storing user specific information (e.g., instead of or in addition to device 402). This may allow better personalization to a user and/or according to past user experience, possible across devices, as well, for example, if a cross-device user id mechanism is provided, such as user login.

In some exemplary embodiments of the invention, server 430 includes a product tracking module 442, for example, for tracking a particular product (e.g., if interacted with by multiple users and/or devices 402).

In some exemplary embodiments of the invention, server 430 includes a sales location tracker, for example, to allow managing a campaign of exposures for products and/or users purchased at a sale location (and/or by chain and/or by distributer and/or other geographical or other classification).

In some exemplary embodiments of the invention, server 430 includes a remote processing module 436 for performing remote processing (e.g., image processing) for other parts of the system and/or act as a server for user interaction with server 430.

Referring now to a unit 450, which, in some embodiments, multiple instances thereof are used by marketers to manage campaigns.

In some exemplary embodiments of the invention, unit 450 includes an offer design module 456 for designing offers which may be exposed to users, for example, graphics, audio and/or interaction logic.

In some exemplary embodiments of the invention, a view tracking module 452 is used to track ongoing campaigns.

In some exemplary embodiments of the invention, a plan setup module 454 is used to set up campaigns and/or modify such campaigns, optionally in response to tracked results.

Exemplary Usage by Marketing

Figure 5:
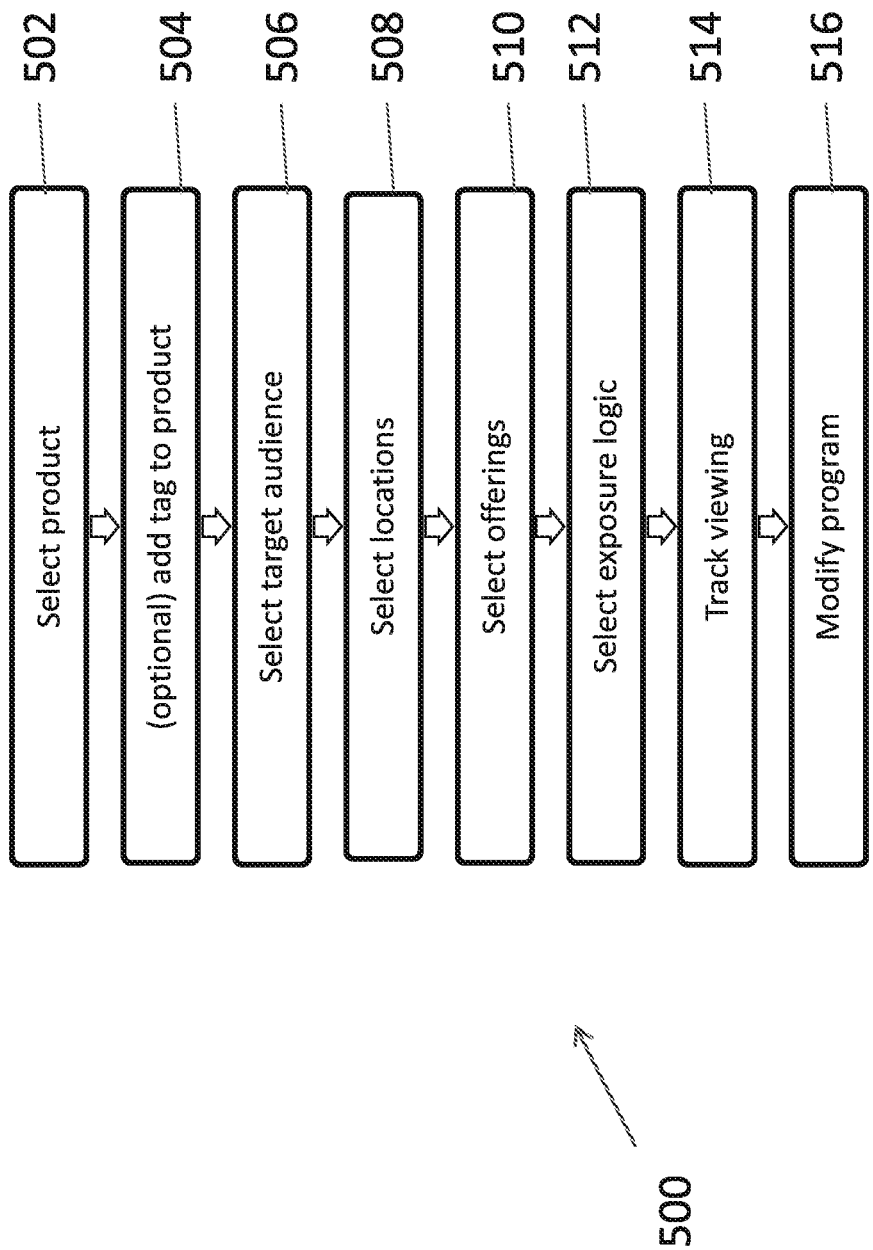
FIG. 5 is a flowchart of a method of planning and execution using an exposure system, in accordance with some exemplary embodiments of the invention.

FIG. 5 is a flowchart 500 of a method of planning and execution using an exposure system, in accordance with some embodiments of the invention.

At 502 a product to have offering therefor is selected. In some exemplary embodiments of the invention, the product is a home brand (e.g., a generic product offered by a store), and the use of offering exposure as described herein can be used to create marketing campaigns for specific products rather than the home brand as a whole, which products do not usually have their one, in place, branding.

At 504 a tag is optionally added to the product, for example, a label with a code and/or marketing information. Optionally, the tag is coded per individual container.

At 506 a target audience is selected. Optionally, different audiences get different audiences. For example, children of different ages may get different offerings, as may different individual children and/or groups of children. Optionally or alternatively, different product sources (e.g., stores and brands) and different offerings. Optionally, a particular store is recognized, during offer generation, by the user imaging the store or store logo.

At 508, locations (e.g., for using the product and/or buying) may be selected. For example, a campaign may change an offering based on an actual location (or area) of purchase and/or use. Optionally, positioning systems found in cellular telephones are used to determine usage location.

At 510 the offerings to be shown may be selected. As noted, these may depend on the demographic, for example, age or religious sensibilities or other cultural characteristics. In some exemplary embodiments of the invention, the offerings are vetted and/or selected by a guardian, for example a parent of a user. In some embodiments, such selection is by a guardian defining a filter on allowed offering characteristics, and each offering is provided with one or more values for such characteristics to be used in such filtering. Optionally, a guardian or other user can opt out and block some or all offerings from being shown on a certain device. Optionally or alternatively, the offerings may be selected and/or vetted by another actor in the supply chain, for example, a supermarket manager, a regional manager and/or a brand manager. This may be a different actor form a campaign manager. For example, a brand manager selecting a campaign parameter in general (e.g., a set and/or range(s)) and a store manager choosing what specific offerings to provide. Also, the offerings may be automatically modified per location, for example, an address in the offering may be automatically set to that of a particular store, based, for example, on where purchase was made. For example, for a same product, different stores may show different themes of offerings (e.g., different sets of animated characters).

At 512, an exposure logic is selected, for example, based on filling level and/or user profile and/or usage profile. Optionally, usage profile includes timing of events, so, for example, an offering may be shown based on time from last interaction and/or based on time from purchase. Purchase time is optionally estimated based on time of delivery to a retailer, based on data collected by the retailer and/or by user input.

In some exemplary embodiments of the invention, exposure logic takes into account that multiple users may use the same package. Optionally, different users are exposed to different offers, optionally independent from each other, based on identification thereof, for example, via device 402.

In some exemplary embodiments of the invention, exposure logic selection (and/or selection of other logics and/or behaviors) comprises selecting (including defining) a set of logics for later selection and optionally a selection logic for optionally selecting among the set, optionally in real time with user interaction.

At 514, the actual exposing and/or viewing of offerings and/or interaction with offerings by users is tracked. In some exemplary embodiments of the invention, additional offerings are based thereon. For example, an offering (or other offer to a user) may be made in response to usage of product combinations (e.g., bread and jam, each identified separately). Optionally, combinations are identified based on imaging of a composite, for example, a plate with multiple food items thereon. Optionally, such identification sis implied by a user providing (manually or using imaging) an identification of the product packages, so a simpler image recognition process may be used (e.g., using templates and/or rules matched to those packages).

At 516, the campaign and/or details of offerings shown are optionally modified, optionally in real-time (e.g., having an effect with 1-3 hours or 1-3 minutes or intermediate or shorter times), optionally in response to tracking and/or external constraints (e.g., actual sales, cost overruns and/or media feedback).

General

It is expected that during the life of a patent maturing from this application many relevant offerings will be developed; the scope of the term offering is intended to include all such new technologies a priori.

As used herein with reference to quantity or value, the term "about" means "within ±10% of".

The terms "comprises", "comprising", "includes", "including", "has", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular forms "a", "an" and "the" include plural references unless the context clearly dictates otherwise. For example, the term "a compound" or "at least one compound" may include a plurality of compounds, including mixtures thereof.

Throughout this application, embodiments of this invention may be presented with reference to a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as "from 1 to 6" should be considered to have specifically disclosed subranges such as "from 1 to 3", "from 1 to 4", "from 1 to 5", "from 2 to 4", "from 2 to 6", "from 3 to 6", etc.; as well as individual numbers within that range, for example, 1, 2, 3, 4, 5, and 6. This applies regardless of the breadth of the range.

Whenever a numerical range is indicated herein (for example "10-15", "10 to 15", or any pair of numbers linked by these another such range indication), it is meant to include any number (fractional or integral) within the indicated range limits, including the range limits, unless the context clearly dictates otherwise. The phrases "range/ranging/ranges between" a first indicate number and a second indicate number and "range/ranging/ranges from" a first indicate number "to", "up to", "until" or "through" (or another such range-indicating term) a second indicate number are used herein interchangeably and are meant to include the first and second indicated numbers and all the fractional and integral numbers therebetween.

Unless otherwise indicated, numbers used herein and any number ranges based thereon are approximations within the accuracy of reasonable measurement and rounding errors as understood by persons skilled in the art.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of controlling a displayed augmentation, comprising:
   (a) at a first location, defining an offering using a computing device, by:
      (i) selecting, using said computing device, an object, a position on the object and an exposure to associate with the object using said position;
      (ii) selecting, using said computing device, a logic for determining showing of said exposure; and
      (iii) selecting, using said computing device, a logic for modifying said exposure upon manipulation thereof;
   (b) sending said offering to a remote device, having an imager, at a second location; and
   (c) at the second location, exposing said offering by:
      (i) imaging said object using said imager to acquire an image thereof;
      (ii) automatically identifying said object using said image;
      (iii) using said remote device, displaying said selected exposure as an image augmentation to said image responsive to said selected logic for determining, said augmentation visually extending away from a surface of object;
      (iv) detecting, by said remote device, a physical interaction with a position in space on or in said physical object at and associated with said exposure;
      (v) automatically modifying said exposure responsive to said physical interaction and said selected logic for modifying; and
      (vi) update said display of said selected exposure based on said modifying,
   wherein, said sending comprises sending as part of an advertising campaign and comprising building an advertising campaign including a campaign logic defining a linkage between a target audience including a plurality of users, a product and an offering and including interaction logic; and further comprising:
   tracking said campaign, including collecting information on a plurality of exposures and physical interactions associated with said campaign; and
   dynamically determining an exposure to show to a user of said target audience according to said campaign in response to (i) said tracking of physical interactions of users other than said user and (ii) physical interaction of said user with said object after said interaction logic is applied.

2. A method according to claim 1, wherein said image augmentation comprises a dynamic visual augmentation of a live image.

3. A method according to claim 1, wherein said object comprises packaged food and wherein said automatically identifying comprises identifying using a label on said package.

4. A method according to claim 1, wherein said object comprises a human body part.

5. A method according to claim 1, wherein said remote device comprises wearable glasses.

6. A method according to claim 1, wherein said sending comprises sending different offerings based on one or more of a target demographic, location of purchase, location of use and/or user identification.

7. A method according to claim 1, wherein said displaying is responsive to one or more of previous exposures of an offering for that object and/or for a same user, changes in the object geometry and/or time since a last exposure for that object.

8. A method according to claim 1, comprising additionally managing said campaign by a third party which has control over filtering offerings for one or more locations or demographics, using one or more rules, said rules defining what exposures cannot be sent to certain locations and/or demographics.

9. A method according to claim 1, comprising modifying an offering to be shown for an object between a purchase of the object and first exposure of an offering therefore, in response to said collected information.

10. A method according to claim 1, wherein said logic for modifying comprises a sequence of interactions.

11. A method according to claim 1, wherein said logic for modifying requires said physical interaction to be by a body part.

12. A method according to claim 1, wherein said logic for modifying requires said physical interaction to be by a tool.

13. A method according to claim 1, wherein said physical interaction is within 1 meter from said imager.

14. A method according to claim 1, wherein said logic for modifying requires said physical interaction to be with said augmentation.

15. A method according to claim 1, wherein said logic for modifying requires said physical interaction to be with said object.

16. A method according to claim 15, wherein said logic for modifying requires said physical interaction to include a change in object volume.

17. A method according to claim 1, comprising, at a third location, using a second device, second interacting with a related augmentation of an identical object and wherein said logic of modifying uses said second interacting for said modifying.

18. A method according to claim 1, comprising automatically filtering said displaying according to an estimated age of a user of said remote device.

19. A method according to claim 1, wherein said logic for determining comprises logic for determining if to show said exposure.

20. A method of controlling a displayed augmentation, comprising:
(a) at a first location, defining an offering using a computing device, by:
(i) selecting, using said computing device, an object, a position on the object and an exposure to associate with the object using said position;
(ii) selecting, using said computing device, a logic for determining showing of said exposure; and
(iii) selecting, using said computing device, a logic for modifying said exposure upon manipulation thereof;
(b) sending said offering to a remote device, having an imager, at a second location; and
(c) at the second location, exposing said offering by:
(i) imaging said object using said imager to acquire an image thereof;
(ii) automatically identifying said object using said image;
(iii) using said remote device, displaying said selected exposure as an image augmentation to said image responsive to said selected logic for determining;
(iv) detecting, by said remote device, a physical interaction by an individual user with a position in space associated with said exposure;
(v) automatically modifying said exposure responsive to said physical interaction and said selected logic for modifying; and
(vi) update said display of said selected exposure based on said modifying,
wherein said sending comprises sending as a message from a first user using said computing device to an individual user selected by said first user using said remote device,
wherein said interaction logic includes manipulation logic which triggers said displaying to start in response to said physical manipulation of said object by said individual user.

21. A method according to claim 20, wherein said displaying is responsive to a face detection.

22. The method of claim 20, wherein said sending comprises sending, as part of said message, an indication which manipulations activate the offering and/or a time window where the offering can be activated.

23. The method of claim 20, wherein said displaying said selected exposure is performed after detecting a physical interaction with or adjacent said object.

24. The method of claim 20, wherein said displaying said selected exposure is performed only if said same object or a similar object is interacted with or viewed by a third user other than said individual user, at a same time.

25. The method of claim 20, wherein sending comprises sending said logic for determining and an identification of the object and wherein said automatically identifying comprises identifying using also said sent identification.

26. The method of claim 20, wherein said exposing said offering is dependent on a location of said second location.

* * * * *